United States Patent [19]
Taralli et al.

[11] 3,754,466
[45] Aug. 28, 1973

[54] APPARATUS FOR THE IMPREGNATION TREATMENT AND EVENTUAL STERILIZATION OF COCOA SEEDS OR BEANS WITH WATER OR ALKALINE SOLUTIONS

[75] Inventors: Claudio Taralli; Elio Stefani, both of Milan, Italy

[73] Assignee: Carle & Montanari S.p.A., Milan, Italy

[22] Filed: Mar. 10, 1972

[21] Appl. No.: 233,530

Related U.S. Application Data

[62] Division of Ser. No. 881,414, Dec. 2, 1969.

[30] Foreign Application Priority Data
Dec. 4, 1968 Italy .............................. 24571 A/68

[52] U.S. Cl. .......................... 99/348, 99/26, 99/472, 99/516
[51] Int. Cl. .............................................. B01f 7/16

[58] Field of Search ...................... 99/467, 472, 516, 99/483, 68, 65, 26, 104, 348, 485

[56] References Cited
UNITED STATES PATENTS

| | | | |
|---|---|---|---|
| 2,589,801 | 3/1952 | Grindrod | 99/467 |
| 3,223,021 | 12/1965 | Osswald | 99/236 |
| 3,329,506 | 7/1967 | Smith | 99/472 |
| 3,412,671 | 11/1968 | Merlis | 99/483 |
| 3,675,902 | 7/1972 | Marshall | 99/348 |

*Primary Examiner*—Robert W. Jenkins
*Attorney*—Irving M. Weiner

[57] ABSTRACT

A process for impregnating a substance, such as cocoa seeds or beans, with a fluid, such as water or an alkaline solution. The substance is subjected to vacuum action in a suitable environment for a selected period of time, and then mixed with the fluid in an impregnating environment at a pressure of at least one atmosphere. The impregnated substance is rapidly dried in an environment at a pressure which is less than one atmosphere.

10 Claims, 3 Drawing Figures and the like, are obtained by such processes.
APPARATUS FOR THE IMPREGNATION TREATMENT AND EVENTUAL STERILIZATION OF COCOA SEEDS OR BEANS WITH WATER OR ALKALINE SOLUTIONS This application is a divisional of pending application Ser. No. 881,414 filed Dec. 2, 1969.

This invention relates to an apparatus for the impregnation treatment and eventual sterilization of a substantially solid substance, such as cocoa seeds or beans, with a fluid, such as water or alkaline solutions.

For example, it has been known for some time that by treating cocoa seeds or beans with water or various alkaline solutions, an improvement in their color, a diminution of free acid, and a better suspension of cocoa powder in drinks are obtained by such processes.

The results of the treatment are greater the more complete the impregnation is of the vegetable fibres. With the processes used up to now, this impregnation is very slow and incomplete.

Furthermore, the successive operation of drying in order to eliminate water after treatment is long and costly.

SUMMARY OF THE INVENTION

The present invention provides a process for the impregnation treatment of a substantially solid substance with a fluid, and includes the step of subjecting the substantially solid substance to vacuum action in a suitable environment for a selected period of time. Then, the substantially solid substance is mixed with the fluid in a suitable impregnating environment at a pressure of at least one atmosphere. Thereafter, the impregnated substantially solid substance is rapidly dried in an environment at a pressure which is less than one atmosphere.

The present invention also provides an apparatus for carrying out an impregnation treatment, wherein the apparatus includes a hopper for holding the substantially solid substance to be impregnated, and a tank containing the impregnating fluid. A container is provided which has a cylindro-conical shape for receiving the substantially solid substance to be impregnated. The container is provided with suitable vacuum type valves by means of which the container is connected to the hopper and to the tank. The container is also provided with means for obtaining and maintaining internally a predetermined degree of vacuum. The container is also provided with heating means for obtaining and maintaining a temperature suitable for the treatment of the substantially solid substance. The container also has suitable means for stirring the substantially solid substance and impregnating fluid. The container is provided with an opening at its base which is closed by an airtight valve by means of which the treated product may be discharged by gravity.

Although the invention may be employed for impregnating any substantially solid substance with a fluid, it is especially suitable for impregnating foodstuffs, such as cocoa beans, with water or an alkaline solution.

The main object of this invention is that of obviating the defects and disadvantages of systems presently used for such impregnation treatment, by means of a process which ensures deeper penetration of the water or alkaline solution into the inside of the vegetable fibres to be impregnated, thus conferring better results from the point of view of the successive processing of the cocoa for the reasons mentioned.

A further object of the invention is to provide an apparatus which allows elimination of the greater part of the water at low temperature and reduced pressure at the termination of impregnation treatment, and thereby considerably shortening the drying time.

Finally a further object of the invention is that of providing an apparatus which, in addition to carrying out the impregnation of the cocoa as previously mentioned, allows the raw materials to be subjected to a process of sterilization, thus obviating an obvious deficiency in the field of preparation of cocoa and its derivatives.

These and other objects are attained by the process for impregnation treatment of cocoa seeds or beans according to the present invention, in which the cocoa seeds or beans to be impregnated are previously subjected to vacuum action in a suitable environment where impregnation at atmospheric or higher pressure is successively carried out, and at the end of the treatment obtaining rapid drying with the use of a suitable pump which restores the low pressure environment.

The novel apparatus allows sterilization of the product to be obtained by raising the temperature inside the container to about 120°C.

One possible apparatus or means for carrying out the process comprises a cylindro-conical container in the inside of which the vacuum can be created by means of a suitable pump, and whose external walls are surrounded by a coil heated by steam or the like, while a special rotating scraper stirrer permits uniform mixing together of liquid and solid, the whole assembly being provided with suitable valves.

BRIEF DESCRIPTION OF THE DRAWINGS

The invention is described in detail hereinafter with reference to one embodiment of the treatment means given by way of example and illustrated in the accompanying drawings, in which.

DETAILED DESCRIPTION OF A PREFERRED EMBODIMENT OF THE INVENTION

Figure 1:
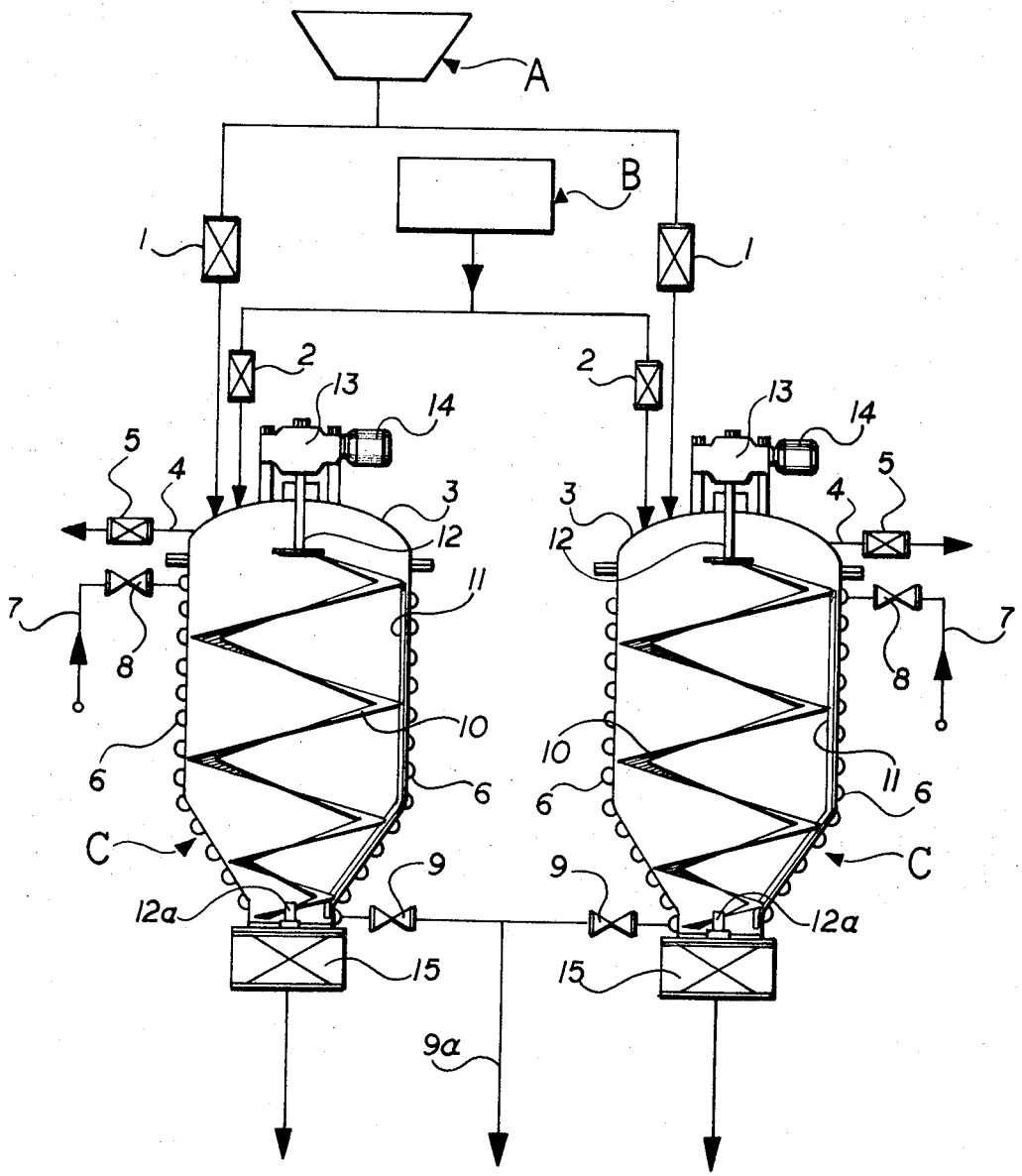
FIG. 1 shows diagrammatically one embodiment of an entire treatment apparatus including two containers.
Figure 2:
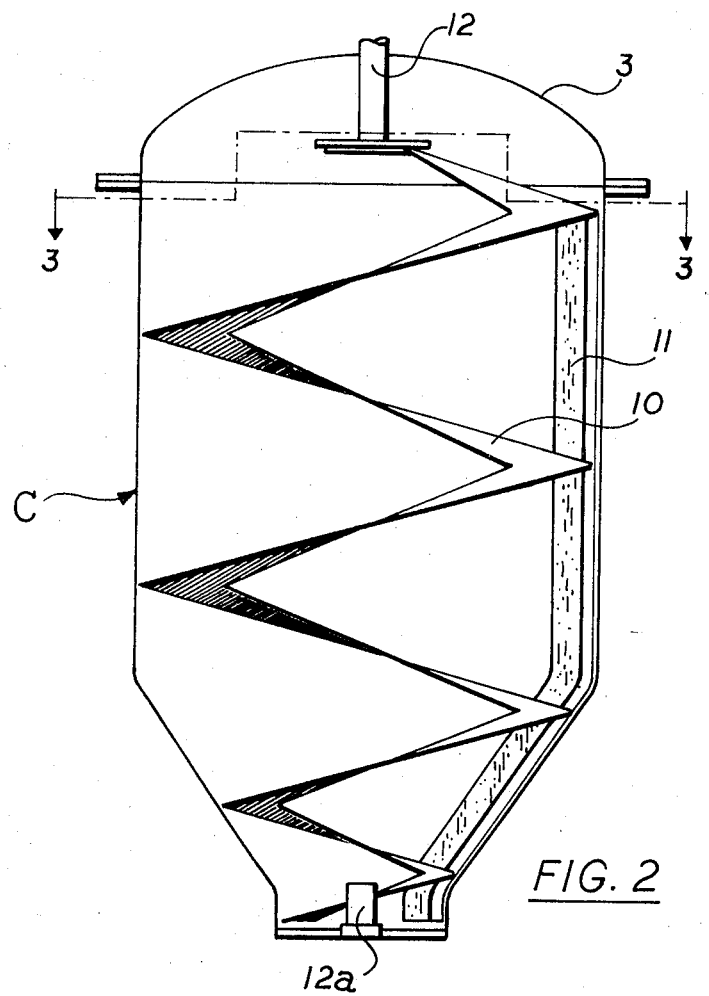
FIG. 2 shows an axial section through one of the containers in which the heating coil has been omitted for greater clarity.
Figure 3:
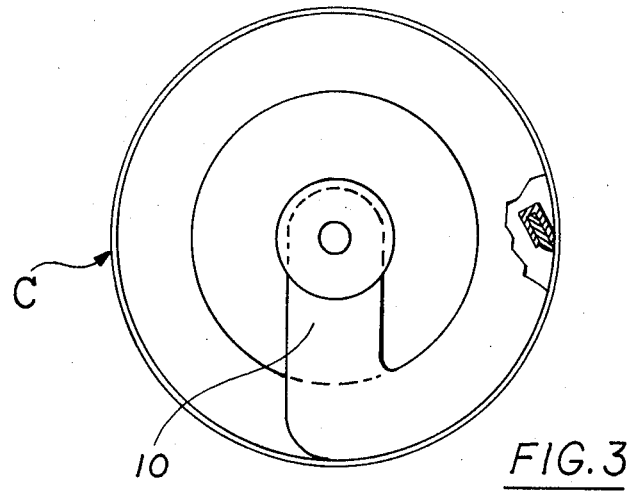
FIG. 3 is a horizontal sectional view of the container through the line 3—3 of FIG. 2.

Referring to the accompanying drawings, the flowsheet of the plant or apparatus shown in FIG. 1 comprises two treatment containers constructed according to the present invention. For the purpose of obtaining continuity of production, when one container is carrying out treatment the other is in the discharge phase, and vice versa.

In FIG. 1 the reference letter A indicates a hopper into which a weighed quantity of a substantially solid substance, such as cocoa seeds or beans, is loaded and the reference letter B indicates a tank which contains an impregnating fluid, such as water or alkaline solution. Both the hopper A and the tank B are connected to the treatment apparatus or container C with the interpositioning of valves 1 and 2, respectively, which are vacuum tight.

The treatment apparatus or container C may, for example, consist of a stainless steel container having a substantially cylindro-conical form with its upper base closed by a cover 3 of flanged elliptical profile, suitable for withstanding vacuum and at least two atmospheres pressure.

In the upper zone of each container C, a connection with a duct 4 is provided which is connected to a suction pump (not shown) and interrupted by a valve 5.

A coil 6 of semi-circular cross section is provided, wound in the form of a spiral on the external wall of each container C and fed by a supply of steam (not shown) by way of a duct 7 and a valve 8. Each of the two coils 6 in the plant or apparatus shown in FIG. 1 is provided with an automatically operating valve 9 for the discharge and removal of condensate which can be discharged by way of a single duct 9a.

Inside each container C there is a stirrer 10 which may, for example, consist of a steel ribbon formed as a spiral of large pitch. The stirrer 10 provides or guarantees delicate but intense movement of the product. A scraper 11 made of synthetic material may be connected to the stirrer 10 and may be arranged adhering to the cylindro-conical internal wall, and therefore has a shape similar to the two generating lines of the cylinder and the cone.

The stirrer 10-scraper 11 combination is driven by way of a shaft 12 of a worm reduction unit 13 by a motor 14, the whole drive assembly being arranged on the summit of the cover 3 of the container C.

On the open bottom of the container C there is a valve 15 for discharging the treated material. A pivot or counter shaft 12a supports the spiral ribbon stirrer 10 at the bottom.

The treatment process, as used for cocoa beans or seeds, may proceed in the following manner.

A weighed quantity of cocoa bean is placed in the hopper A sufficient for loading each treatment container C. At the same time, water or an aqueous solution of alkaline substance is placed in the tank B in the quantity and strength sufficient for the degree of treatment desired.

On opening the valve 1 of one of the two containers C the cocoa bean is introduced into the container. Then the valve 1 is closed vacuum tight, and the suction or vacuum pump (not shown) aspires or removes the air through the associated duct 4 with the valve 5 open. When the desired degree of vacuum has been attained, the valve 5 is automatically closed and the pump stops. The product then remains for a certain or selected period of time (variable) under these conditions of very low pressure.

The water or alkaline solution is then introduced into the container C while maintaining the pressure in the container C, and the corresponding stirrer 10 with its affixed scraper 11 enters into operation thereby giving rise to an intimate mixing of the liquid and cocoa beans.

At the same time, heat is applied to the external wall of the container C by feeding the associated coil 6 with steam, until the desired temperature is attained internally.

The length of impregnation treatment cannot be established precisely as it is a function of various factors, such as the weight of the cocoa to be treated and, consequently, the capacity and volume of the apparatus, its degree of filling, the degree of granularity of the beans themselves, their initial humidity conditions, etc.

At the end of the impregnation treatment, the water becomes superfluous and is eliminated (partially or completely) by evaporation at reduced pressure with the aid of the aforementioned vacuum pump, thus accelerating drying.

The treated and dried product is then discharged by opening the valve 15 of the container C in operation, and is then passed to the next process.

When sterilization of the cocoa bean is desired in addition to the impregnation by water or alkaline substances, it is sufficient to raise the temperature inside the apparatus to about 120°C during the heating phase for the time necessary for this purpose.

When the time considered sufficient for impregnation and sterilization has elapsed, the suction or vacuum pump is put into operation. This creates better conditions for removal of water from the bean and, consequently, for rapid drying of the treated product.

We claim:

1. An apparatus for impregnating and sterilizing a substantially solid substance with a fluid, comprising, in combination:

a hopper for holding said substantially solid substance to be impregnated;

a tank containing an impregnating fluid;

a container having a cylindro-conical shape for receiving said substantially solid substance to be impregnated;

said container being provided with suitable vacuum type valves by means of which said container is connected to said hopper and to said tank;

said container being provided with means for obtaining and maintaining internally a predetermined degree of vacuum;

said container being provided with heating means for obtaining and maintaining a termperature suitable for the treatment of said substantially solid substance;

said container being provided with suitable means for stirring said substantially solid substance and said impregnating fluid;

and said container being provided with an opening in its base which is closed by an airtight valve by means of which the treated product may be discharged by gravity.

2. An apparatus according to claim 1, wherein: said hopper holds cocoa seeds or beans;

said tank holds the impregnating fluid which includes water or an aqueous solution of an alkaline substance;

said container is a steel container of a cylindro-conical form for receiving said cocoa seeds or beans;

said container being provided with heating means for obtaining and maintaining a temperature suitable for the treatment of said cocoa seeds or beans;

said container being provided with suitable stirring means;

and the treated product being discharged by gravity through an opening at the base of said container which is closed by an airtight valve.

3. An apparatus characterized in accordance with claim 2, wherein said means for obtaining and maintaining internally said predetermined degree of vacuum includes a duct connected to a suction pump through at least one airtight valve.

4. An apparatus characterized in accordance with claim 2, wherein said stirring means includes a steel ribbon of spiral form moved by a shaft coaxial with the longitudinal axis of said container and driven by a suitable external motor by means of a reduction gear, and a segment being rigidly affixed to said spiral steel ribbon and being provided in contact with the internal cylindro-conical wall of said container and disposed along the corresponding generating lines.

5. An apparatus characterized in accordance with claim 4, wherein said means for obtaining and maintaining internally said predetermined degree of vacuum includes a duct connected to a suction pump through at least one airtight valve.

6. An apparatus characterized in accordance with claim 5, wherein said heating means is capable of bringing the temperature in said container to at least substantially 120°C. for the purpose of sterilizing the treated product.

7. An apparatus characterized in accordance with claim 2, wherein said heating means is capable of bringing the temperature in said container to at least substantially 120°C for the purpose of sterilizing the treated product.

8. An apparatus characterized in accordance with claim 1, wherein said means for obtaining and maintaining internally said predetermined degree of vacuum includes a duct connected to a suction pump through at least one airtight valve.

9. An apparatus characterized in accordance with claim 1, wherein said heating means is capable of bringing the temperature in said container to at least substantially 120°C. for the purpose of sterilizing the treated product.

10. An apparatus characterized in accordance with claim 1, wherein said suitable means for stirring includes a steel ribbon of spiral form moved by a shaft coaxial with the longitudinal axis of said container and driven by a suitable external motor by means of a reduction gear, and a segment being rigidly affixed to said spiral steel ribbon and being provided in contact with the internal cylindro-conical wall of said container and disposed along the corresponding generating lines.

* * * * *

UNITED STATES PATENT OFFICE
CERTIFICATE OF CORRECTION

Patent No. 3,754,466  Dated August 28, 1973

Inventor(s) Claudio TARALLI and Elio STEFANI

It is certified that error appears in the above-identified patent and that said Letters Patent are hereby corrected as shown below:

Column 1, line 57, after "solid" insert --vegetable--; line 67, after the period, insert the following: --Such systems presently used for such impregnation treatment are disclosed by German Patents 509,206; 730,662; 745,398; 830,280; 838,244 and 955,647, and Austrian Patent 124,048.--. Column 3, line 5, after "5" insert --which cooperate to define means for obtaining and maintaining a predetermined degree of vacuum in the container--; line 6, before "coil" delete "A" and insert --Heating means, such as, a--; line 14, after "is" insert --stirring means or--; line 18, after "11" insert --comprising a segment--; line 28, after "material" insert --by gravity--; line 46, before "for" insert --in this environment--; line 50, after "C" delete "while maintaining" and insert --,--; line 51, after "C" insert --is increased to at least one atmosphere--; line 65, after "." insert --Therefore, the length of impregnation may be determined by a trial and error method for different vegetable substances and quantities thereof.--.

Signed and sealed this 19th day of March 1974.

(SEAL)
Attest:

EDWARD M. FLETCHER, JR.
Attesting Officer

C. MARSHALL DANN
Commissioner of Patents